United States Patent

[11] 3,576,564

[72] Inventor Aaron A. Galvin
 Lexington, Mass.
[21] Appl. No. 783,289
[22] Filed Dec. 12, 1968
[45] Patented Apr. 27, 1971
[73] Assignee Aerospace Research, Inc.
 Boston, Mass.

[54] RADAR PROCESSOR HAVING ADAPTIVE CLUTTER REJECTION
 12 Claims, 6 Drawing Figs.

[52] U.S. Cl. .................................................... 343/7.7,
 343/17.1
[51] Int. Cl. ...................................................... G01s 9/42
[50] Field of Search............................................ 343/7.7,
 17.1

[56] References Cited
 UNITED STATES PATENTS
 2,871,468 1/1959 Smith ........................... 343/7.7X
 3,267,468 8/1966 Stull .............................. 343/7.7

3,776,426 1/1957 Altman......................... 343/7.7X
 2,870,331 1/1959 Gray............................. 343/17.1X
 3,312,969 4/1967 Halstead....................... 343/17.1X
 3,149,333 9/1964 Campbell..................... 343/17.1

OTHER REFERENCES
Skolnik, Introduction to Radar Systems, 1962 pp. 117— 18.

*Primary Examiner*—Rodney D. Bennett, Jr.
*Assistant Examiner*—Joseph G. Baxter
*Attorney*—Joseph Weingarten

ABSTRACT: A radar signal processing system wherein clutter signals which are continually varying in amplitude and spectral distribution are cancelled in an optimum manner by means adaptive to particular clutter conditions, thereby to permit effective target detection and low false alarm rate operation in the presence of such clutter. An electronically variable high pass filter is employed, the response of which automatically adjusts to input clutter conditions to provide the required amount of clutter cancellation while at the same time affording optimal target detection.

RADAR PROCESSOR HAVING ADAPTIVE CLUTTER REJECTION

FIELD OF THE INVENTION

This invention relates to radar systems and more particularly to Doppler radar systems having means for detecting moving targets in the presence of clutter.

BACKGROUND OF THE INVENTION

In a Doppler radar system it is important to discriminate signals attributable to a target from signals attributable to clutter. Any radar system which is attempting to detect or track a target which is moving along the ground is subject to radar backscatter energy from the local terrain as well as from the target of interest. This terrain backscatter, which may be reflections from natural objects such as trees, foliage, rocks, hills, etc. or manmade objects such as buildings represents a source of radar signals which tend to mask the target of interest, these spurious signals being referred to as clutter. In a marine environment, clutter is caused by backscatter from the sea. The level of clutter can vary substantially depending on many factors such as the size of the radar resolution cell, the roughness of the terrain or sea, the amount of foliage and the angular disposition of the radar beam relative to the terrain. In addition to variation of clutter level, the distribution of clutter power in Doppler frequency, that is the clutter spectrum, can vary considerably. If a radar views the ground with a stationary antenna and there is no wind present, the clutter spectrum will be narrowly constrained in Doppler frequency, the width of this spectrum being determined only by small instabilities in the radar system. However, there are a number of factors which can cause this spectrum to broaden considerably, such as wind which can cause motion in the foliage or, at sea, cause increased wave activity, rotation of the radar antenna at a fixed location or translation of the radar antenna such as might occur when the antenna is supported on an airborne or shipborne platform.

The large variation in clutter spectral characteristics causes difficulties in Doppler radar systems in that the amount of clutter that is passed by the radar's signal processing equipment can be highly variable and under some circumstances can result in a high false alarm rate, that is, the false detection of clutter as true targets.

In general, clutter reduction in conventional systems has been attempted by signal processing techniques based on assumptions concerning the expected spectrum and amplitude level of clutter. Moreover, as described, the clutter spectrum and level varies considerably in practice depending upon the cause and particular nature of the clutter, and therefore a priori knowledge of clutter spectra or level is not available for optimum clutter rejection.

The false alarm rate has been controlled to some extent in conventional radar systems by use of fixed Doppler filters which are designed to pass only high Doppler frequencies, or by varying the gain of a signal processing channel in response to variations in the level of clutter passing through the radar filters. However, the use of fixed filters sacrifices the detection of low velocity targets for a lower false alarm rate, while the use of gain variation reduces the overall sensitivity of the system to targets in the presence of clutter of wide spectral spread. Thus, in a dynamic environment in which the clutter spectral spread varies greatly, conventional fixed filter systems often lack effective clutter rejection and therefore suffer high false alarm rates.

SUMMARY OF THE INVENTION

In accordance with the present invention, a radar processor is provided which utilizes a measure of clutter spectrum present in a particular interval of time to set the cutoff frequency of an electronically variable filter which dynamically maintains an acceptable clutter output level as its spectrum varies with operating conditions. Briefly, a radar processor according to the invention includes an electronically variable high pass filter having a first output coupled to a feedback control channel and a second output coupled to a target signal detection channel. The control channel is operative to derive a control signal from the Doppler input signals which is fed back to the variable filter to adjust its cutoff frequency in accordance with input signal conditions such that clutter signals are cancelled adaptively as this clutter varies. The target detection channel is operative to detect moving targets and energize suitable target indicators, and such detection is accomplished in a particularly effective manner by virtue of the optimal clutter cancellation afforded by the invention. Knowledge of expected spectra is not necessary, as in known systems, as the invention provides means for maintaining an acceptable clutter output level as its spectrum varies.

Clutter can be characterized as a kind of nonstationary nonwhite noise, that is, noise which has nonconstant statistics and has a variable energy per unit bandwidth which is generally of monotonically decreasing spectral density with increasing Doppler frequency. The present invention is broadly useful in providing adaptive detection of signals in the presence of such noise, or other nonstationary noise with differing shapes of nonwhite spectra, and is not limited to radar signal processing. Nonstationary nonwhite noise is encountered, for example, in sonar detection, acoustic or infrared signal detection, electro-optical signal processing and seismological signal processing systems, and the invention can be employed in any such system to achieve adaptive noise cancellation to provide a low false alarm rate with minimal sacrifice of signal detection probability.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
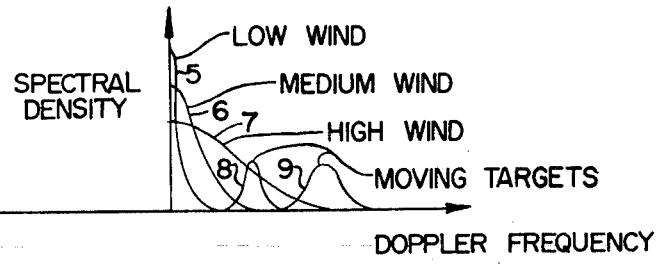
FIG. 1 is a spectral diagram of typical clutter and target signals useful in explaining the operation of the invention.

Before proceeding to a discussion of embodiments of the invention, it will be useful to consider the typical clutter and target spectra illustrated in FIG. 1 in order to explain the novel signal processing techniques employed in cancelling time variable clutter signals. The spectral envelopes 5, 6 and 7 shown in FIG. 1 are of a form typically produced by moving trees under different wind conditions. The relatively narrow spectrum 5 is produced by tree movement at low wind velocities, while successively broader spectra 6 and 7 are produced by tree movements at higher wind velocities. The spectra of two moving targets are shown as envelopes 8 and 9. It is seen that the amplitude of the target envelopes are generally less than the amplitude of the clutter envelopes and that the target envelope 8 is essentially within the spectrum of clutter envelope 7. It will be appreciated that targets moving with a particular velocity can be masked by clutter occuring under certain conditions so that such targets, but for the invention, would not be detectable in fixed-filter systems which utilize high cutoff frequencies to obtain low false alarm rate operation under severe clutter conditions. As will be evident from the discussion which follows, the present invention provides a novel means of discriminating targets from clutter in an optimum manner by adaptively processing clutter and target signals such that time varying clutter signals are dynamically cancelled.

Figure 2:
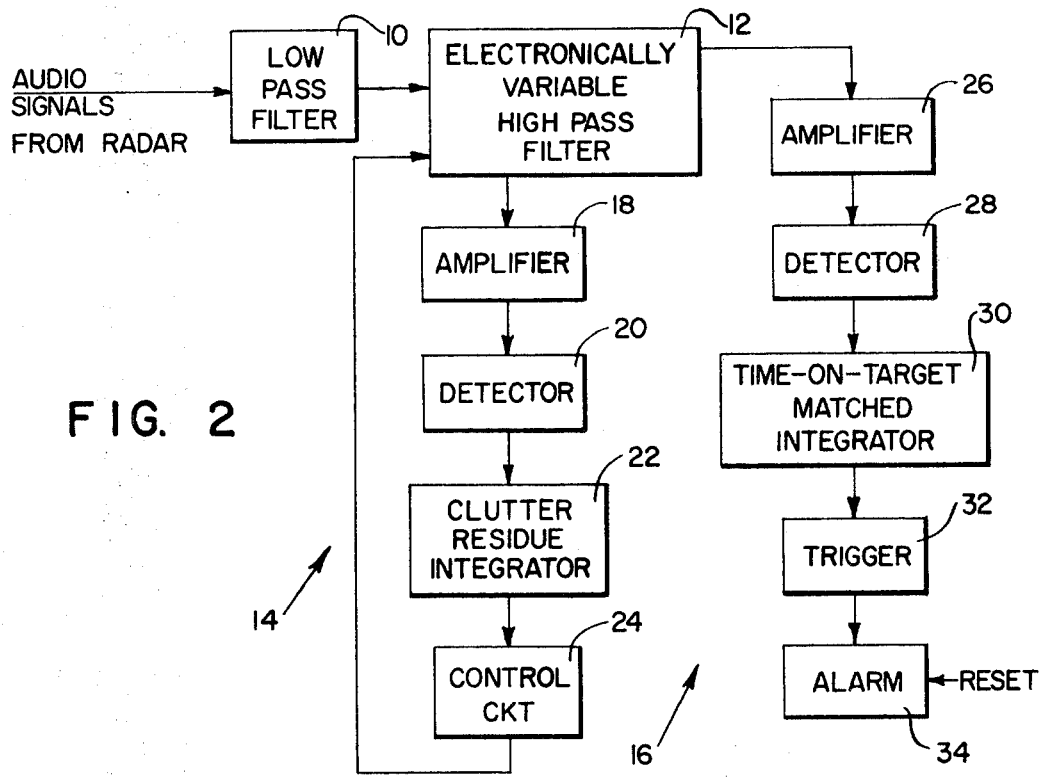
FIG. 2 is a block diagram of a radar processor embodying the invention.

A block diagram representation of a radar processor embodying the invention is illustrated in FIG. 2 and is operative to receive audio signals derived from the output of a CW radar or the output of a sample-and-hold circuit of a pulse radar, these audio signals being representative of the Doppler returns of moving targets being detected. The Doppler signals are applied to a low pass filter 10, the output of which is applied to an electronically variable high pass filter 12 having a first output applied to a feedback control channel 14 and a second output applied to a target signal detection channel 16. The low pass filter 10 has a cutoff frequency effective to eliminate target and radar noise components above the Doppler band of interest. The electronically variable high pass filter 12 has a cutoff frequency which is controllably variable between predetermined limits to provide novel adaptive signal processing according to the invention. Preferably, the second filter output has a steeper-sloped response than the filter response of the first output providing relatively high clutter energy for operation of the clutter cancellation loop. Both of these outputs have approximately the same instantaneous cutoff frequency which is electronically variable.

The feedback control channel 14 includes an amplifier 18, a detector 20, a clutter residue integrator 22 and a control circuit 24. A signal from the first output of filter 12 is amplified and detected in amplifier and detector 18 and 20, respectively, and is then applied to clutter residue integrator 22 which preferably has a time constant several times that of matched integrator 30 in the target signal channel 16 to prevent the filter from adapting to a target signal, which would reduce the probability of detection of that target. Control circuit 24 derives from the integrator output signal a control signal which is fed back to electronically variable filter 12 and which is operative to selectively vary the cutoff frequency of filter 12 to optimally discriminate between clutter and target signals.

The target signal channel 16 includes an amplifier 26, a detector 28, a time-on-target matched integrator 30, a trigger 32 and an alarm 34. After amplification and detection in amplifier and detector 26 and 28, respectively, the second output signal from filter 12 is integrated by matched integrator 30 which is optimized for detection of targets within a predetermined velocity range, which corresponds to a given expected range of target observation times. Trigger 32 is activated by integrator output signals above a predetermined magnitude, the output of the trigger circuit energizing a suitable alarm 34 which may be for example audible or visual. The alarm can be reset manually once the alarm has been noted and the trigger circuit 32 can be of a latching type wherein the alarm will continue in operation until it is reset. The electronically variable filter 12 may itself have sufficient gain to dispense with either or both of amplifiers 18 and 26 in a particular embodiment.

Figure 3:
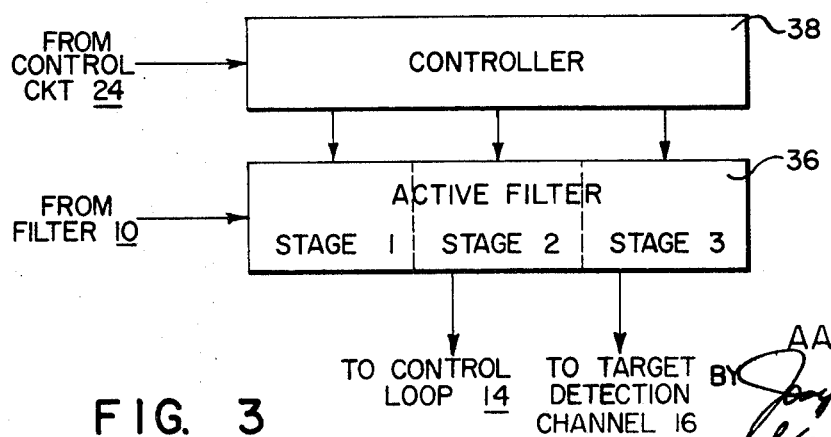
FIG. 3 is a block diagram of an electronically variable filter employed in the invention.

The electronically variable high pass filter 12 can be implemented by a variety of circuits but preferably is an active filter in which precise variation of its characteristics is accomplished with a control signal. One such filter especially useful in the present invention is described in detail in copending application Ser. No. 783,290, filed Dec. 12, 1968, and assigned to the assignee of the present invention. This filter is illustrated diagrammatically in FIG. 3 and includes an active high pass filter 36 and a controller 38 connected to filter 36 and operative to selectively vary its cutoff characteristics in an effective and precise manner. Active filter 36 is essentially a three section RC active high pass filter having a five pole Butterworth response of 30 db. per octave at the output of the third stage and, at the output of the second stage, a three pole Butterworth response of 18 db. per octave. The lower-sloped response output is coupled to control loop 14 to provide relatively high clutter energy for control loop operation. Controller 38 is an array of five matched electronically variable resistors which are associated with the three stages of filter 36 such that precise variation in the resistive value of the matched array will adjust the filter cutoff frequency in linear inverse relation to the resistance values without affecting the basic high pass response. The variable resistance elements employ combinations of photosensitive resistors and light sources wherein variation of light intensity caused by variation in the energizing electrical signal results in a corresponding variation in resistive value. The control signal for this preferred type of filter is a temperature stable variable current derived from a current source driver embodied in control circuit 24, the variable current controllably energizing the light sources of controller 38 which control the photosensitive resistors of controller 38 which, in turn, adjusts the response of active filter 36.

The input to active filter 36 is the low pass filtered audio signals from the radar, while the input to controller 38 is the control signal from control circuit 24 in control loop 14 which provides the intended feedback control. The active filter can have an overall gain throughout the three sections of 30 to 50 db. or more to provide high dynamic range, and in this instance, only one external amplifier 18 need by employed in the illustrated embodiment of FIG. 2 to compensate the gain of control loop 14 with that of the overall filter since the second stage filter output does not experience the same gain as the third stage output.

The active filter 12 is operative in response to the frequency and/or amplitude of input signals applied thereto to vary its cutoff frequency accordingly to optimally cancel clutter signals and thereby permit optimum target detection. The filter response is automatically adjusted such that the signal-to-clutter residue ratio is maintained as high as possible under particular clutter conditions. For example, if a particular clutter spectrum is separated in frequency from the spectrum of a moving target, the filter response is automatically adjusted to cancel only those frequencies in the clutter region, thereby providing relatively wideband target detection. On the other hand, if the clutter spectrum spreads in such a way as to be near or partially mask the target spectrum, the filter response adapts to the new condition to cancel clutter, lowering the signal-to-clutter residue ratio but yet providing optimal target detection under the circumstances. Under certain conditions where the clutter spectral spread is very rapidly increasing, there may be a transient filter adaptation period during which time the probability of false alarm increases, but such conditions are not usual in most operating environments and in the event that it does occur only infrequent false alarms may result.

Figure 4:
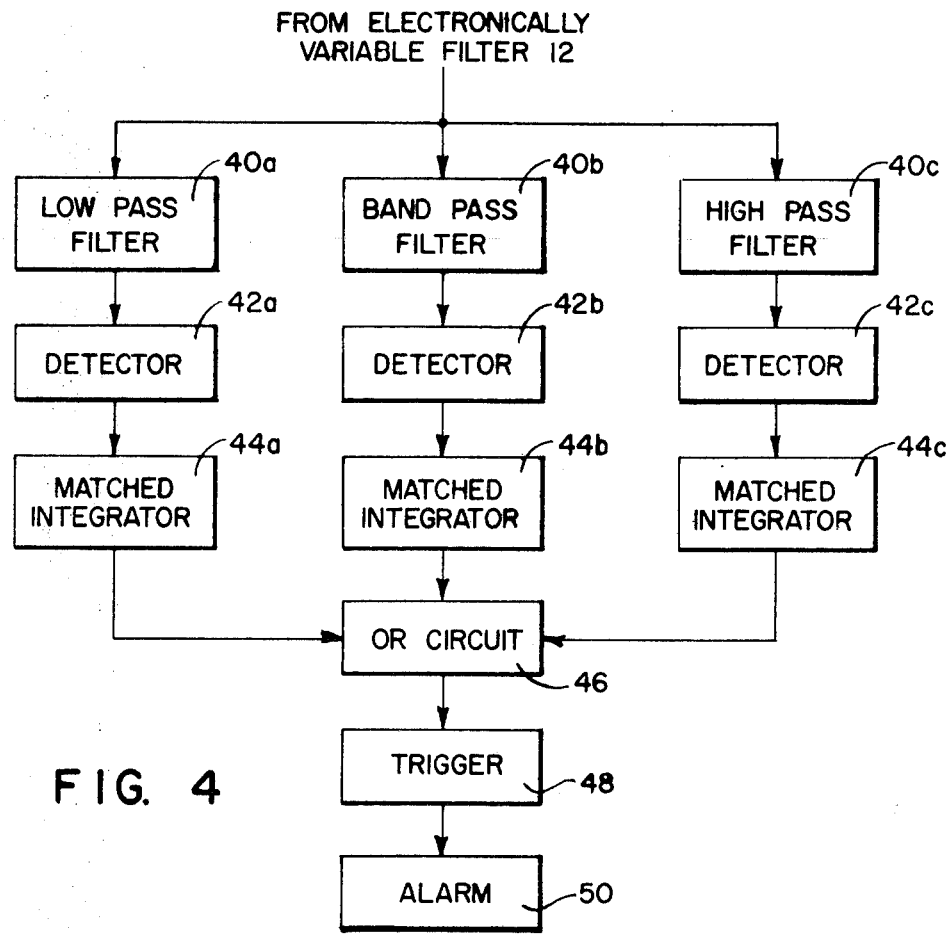
FIG. 4 is a block diagram of an alternative embodiment of the invention.

The target detection channel can be implemented in various ways depending upon the degree of sophistication required in a particular operating environment. For example, FIG. 4 illustrates target detection apparatus operative to provide optimal detection over a wider range of expected target velocities than illustrated in FIG. 2 by providing a plurality of channels matched to particular bands of velocity. Referring to FIG. 4, a multichannel processor is shown for use in place of channel 16 of FIG. 2. Three channels are illustrated, one for low velocity targets, one for medium and one for high velocity targets. Each channel contains a predetection filter 40a, 40b and 40c, a detector 42a, 42b and 42c, and a time-on-target matched integrator 44a, 44b and 44c, each matched integrator having a response providing target matching for those targets whose velocities correspond to the Doppler frequencies passed by the associated preceding predetection filters. The outputs of these integrators are combined in OR circuit 46, the output of which is applied to a trigger circuit 48 which, in turn, drives an alarm 50. Predetection filters 40a, 40b and 40c have effective pass bands to process targets of respective velocity ranges; however, filters 40a and 40c need not be band pass filters as such. Filters 40a, 40b and 40c are driven by signals which have been low pass filtered by input filter 10, and high pass filtered by active filter 12. The low pass response of filter 40a combined with the high pass response of filter 12 therefore provides the intended band pass response for low velocity targets. In like manner, the high pass response of filter 40c combined with the low pass response of filter 10 provides the band pass response desired for high velocity targets. Filter 40b is a band pass filter for intermediate velocity target detection.

Figure 5:
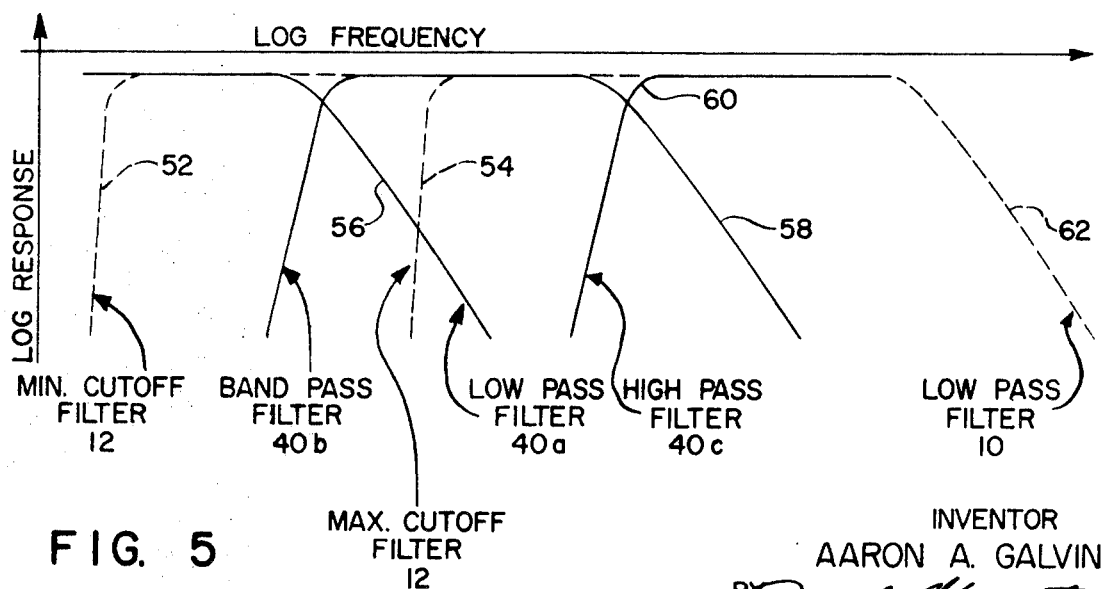
FIG. 5 is a diagram of the filter characteristics of the embodiment of FIG. 4.

The filter response characteristics of the embodiment of FIG. 4 are depicted in FIG. 5. Dotted curves 52 and 54 show the respective minimum and maximum cutoff frequency of variable filter 12. Solid curves 56, 58 and 60 show the low pass response of filter 40a, the band pass response of filter 40b and the high pass response of filter 40c, respectively. The low pass response of input filter 10 is shown as broken curve 62. It is evident that the combined response of filters 12 and 40a provides a predetermined pass band, as do filters 10 and 40c.

Figure 6:
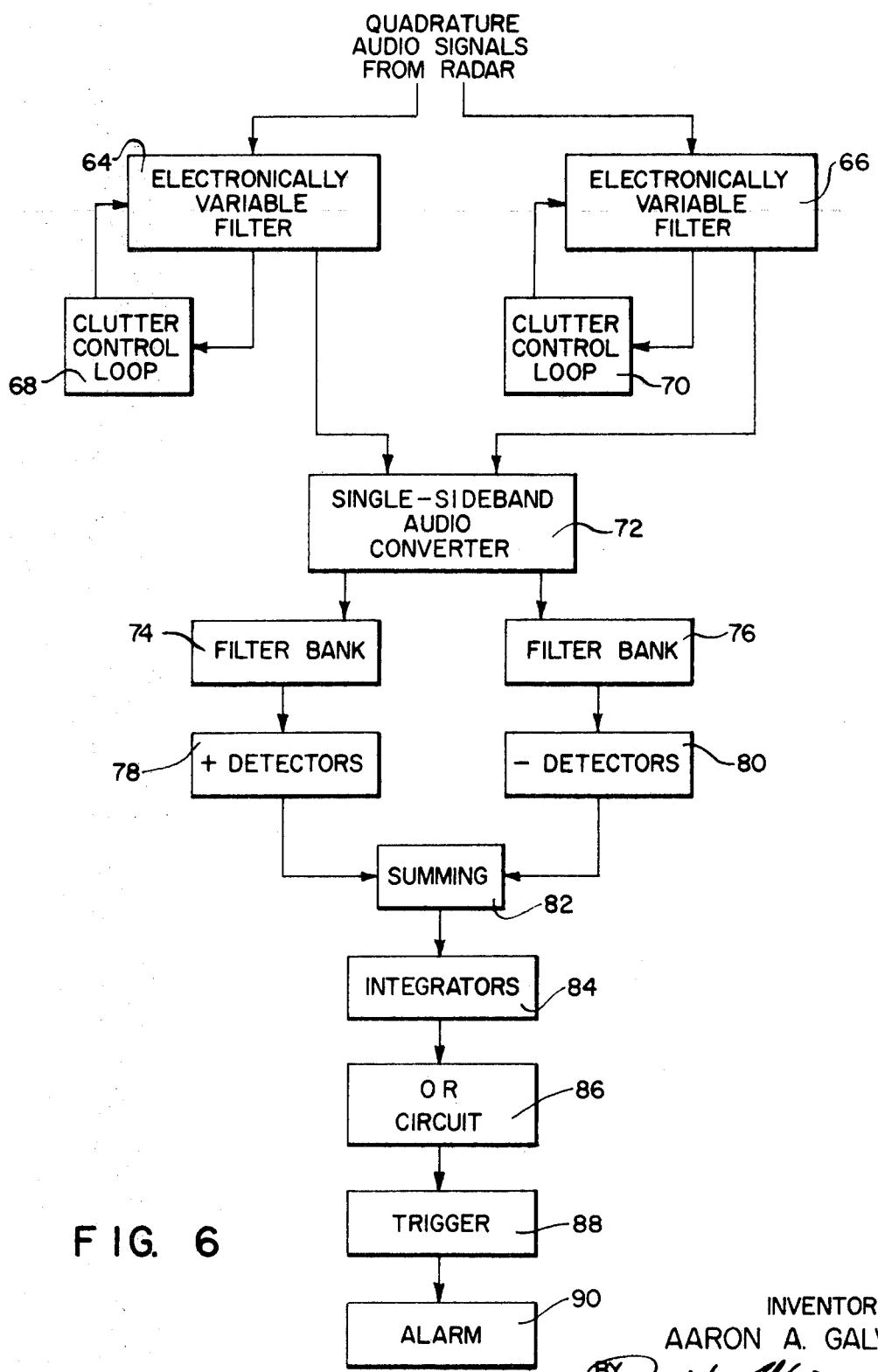
FIG. 6 is a block diagram of a further embodiment of the invention.

FIG. 6 illustrates another embodiment of the invention wherein novel clutter cancellation is employed in a balanced target detection processor. In this embodiment, quadrature components of audio signals derived from a coherent radar are applied to a respective one of a pair of adaptive filters 64 and 66, each having a respective clutter residue feedback control loop 68 and 70, as described hereinabove. The second output of the adaptive filters are applied to single-sideband audio conversion circuitry 72 which provides a pair of outputs, one for targets moving away from the radar and the other for targets moving toward the radar. Each output is then applied to a respective filter bank 74 and 76, each of which is similar to the multichannel filters of FIG. 4. The output of each filter bank is applied to a respective detector 78 and 80, the outputs of which are combined in summing circuit 82. The filter banks are as in the embodiment of FIG. 4 wherein each filter accommodates a range of target velocities. In this embodiment, however, a single integrator is employed for each velocity channel and each integrator is driven by the summed output of a positive and negative polarity detector which has been driven by the outputs of the incoming and outgoing channels respectively. The outputs of the integrators 84 are combined in an OR circuit 86 and applied to a trigger circuit 88 which is operative to energize the alarm 90 when a threshold has been crossed. The integrator can operate on either positive or negative signals; thus, the trigger circuit can activate an alarm on either positive or negative signals which have exceeded the predetermined threshold level.

Although the invention has been described in conjunction with clutter cancellation in a radar processor, it will be appreciated that the invention is, as described hereinabove, also useful in the processing of signals generally wherein nonstationary nonwhite noise is to be discriminated against. Such nonstationary nonwhite noise occurs, for example, in electro-optical, acoustic, infrared, seismological and sonar systems. In addition, systems embodying the invention can be implemented by well-known analog, digital or hybrid circuitry as appropriate in particular instances. Accordingly, the invention is not to be limited by what has been particularly shown and described, as various modifications and alternative implementations will occur to those versed in the art without departing from the spirit and true scope of the invention.

I claim:
1. A system for detecting moving targets in the presence of clutter, comprising:
    input filter means for receiving an input signal which includes a target signal in the presence of clutter;
    an electronically variable filter having first and second outputs;
    means coupled to said first output and operative in response to said clutter to provide a control signal representative of the shape and energy content of the input clutter envelope;
    feedback means for applying said control signal to said electronically variable filter to selectively and adaptively vary the frequency response thereof thereby to dynamically maintain a predetermined signal-to-clutter ratio even in the presence of variable clutter spectra; and
    target detection means coupled to said second output and operative to detect moving targets of a selected velocity range substantially free of said clutter.

2. A system according to claim 1 further including alarm means for indicating the detection of a moving target.

3. A system according to claim 1 wherein said electronically variable filter is a high pass filter, the cutoff frequency of which is variable in response to said control signal.

4. A system according to claim 3 wherein the first output of said electronically variable filter has a lower-sloped response than the response of said second output.

5. A system according to claim 3 wherein the means coupled to said first output includes a detector and a clutter residue integrator, and said control signal is derived from the output signal of said integrator.

6. A system according to claim 5 wherein said target detection means includes a detector, a matched integrator, a target indicator and threshold circuitry operative to activate said target indicator.

7. A system according to claim 6 wherein said clutter residue integrator has a time constant greater than that of the matched integrator of said target detection means.

8. A system according to claim 5 wherein said target detection means includes a plurality of predetection filters each effective to pass selected different ranges of Doppler frequencies, a plurality of detectors, each associated with a respective predetection filter, a plurality of matched integrators each associated with a respective detector and each having a response corresponding to said different ranges of Doppler frequencies, and threshold circuitry operative in response to a signal from any of said matched integrators to indicate a detected moving target.

9. A system for detecting signals in the presence of nonstationary nonwhite noise, comprising:
    means for receiving an input signal which includes a desired signal in the presence of nonstationary nonwhite noise;
    an electronically variable filter operative to receive said input signal and noise and having a predetermined selectively variable frequency response;
    means coupled to an output of said filter for deriving a control signal therefrom in response to and representative of the shape and energy content of the envelope of said input noise;
    means for applying said control signal to said electronically variable filter to selectively and adaptively vary the response thereof thereby to dynamically maintain a predetermined signal-to-noise ratio even in the presence of variable noise spectra; and
    means coupled to an output of said filter for detecting said desired signal.

10. A system according to claim 9 wherein said electronically variable filter includes first and second outputs, the first output being coupled to said means for deriving a control signal, the second output being coupled to said signal detecting means.

11. A system for detecting moving targets in the presence of clutter comprising:
    means for receiving from a coherent radar, quadrature signals which include a target signal in the presence of clutter;
    first and second electronically variable filters each operative to receive a respective quadrature signal and each having first and second outputs;
    a respective clutter control loop coupled to the first output of each of said filters, each control loop including;
    means operative in response to said clutter to provide a control signal representative of the spectral characteristics of said clutter; and
    means for applying said control signal to said filter to selectively and adaptively vary the response thereof thereby to dynamically maintain a predetermined signal-to-clutter ratio even in the presence of variable clutter spectra;
    single-sideband means coupled to the second output of each of said filters and operative to produce first and second signals respectively representative of targets moving toward and away from the radar; and
    means for detecting the presence of moving targets of selected velocity ranges.

12. A system for detecting signals in the presence of nonstationary nonwhite noise, comprising:

means for receiving an input signal which includes a desired signal in the presence of nonstationary nonwhite noise;

an electronically variable high pass filter having first and second outputs and operative to receive said input signal and noise, said first output having a lower-sloped response than said second output;

means coupled to said first output and operative in response to said noise to provide a control signal representative of input noise characteristics;

feedback means for applying said control signal to said filter to selectively and adaptively vary the response thereof thereby to maximize the ratio of signal to noise; and means coupled to said second output for detecting said desired signal.

UNITED STATES PATENT OFFICE
CERTIFICATE OF CORRECTION

Patent No. 3,576,564          Dated April 27, 1971

Inventor(s) Aaron A. Galvin

It is certified that error appears in the above-identified patent and that said Letters Patent are hereby corrected as shown below:

In the references cited, Patent 3,776,426 (Altman) should read 2,776,426.

Column 6, line 62, delete ";" after "including".

Signed and sealed this 28th day of March 1972.

(SEAL)
Attest:

EDWARD M. FLETCHER, JR.          ROBERT GOTTSCHALK
Attesting Officer                Commissioner of Patents